June 26, 1934.    H. L. VAN DOREN    1,964,489
WEIGHING SCALE
Filed Jan. 17, 1933
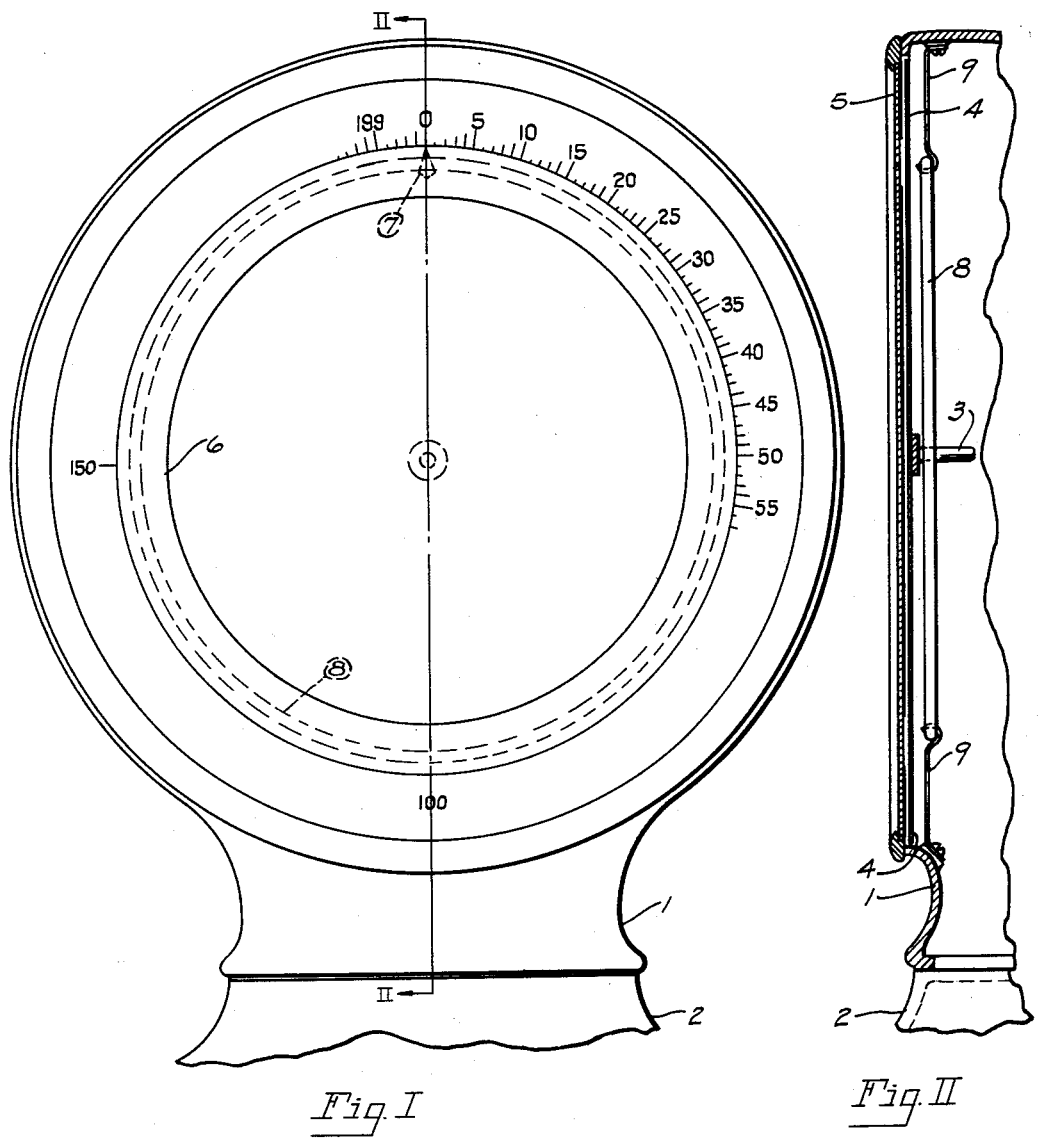
Fig. I  Fig. II
Harold L. VanDoren
INVENTOR
BY Marshall
ATTORNEY Patented June 26, 1934

1,964,489

UNITED STATES PATENT OFFICE 1,964,489

WEIGHING SCALE

Harold L. van Doren, Toledo, Ohio, assignor to Toledo Scale Manufacturing Company, Toledo, Ohio, a corporation of New Jersey Application January 17, 1933, Serial No. 652,150

2 Claims. (Cl. 116—129)

This invention relates to weighing scales and more particularly to the indicating means employed therein. The principal object of this invention is the provision of improved means for obtaining a scale indication in which errors due to parallax are obviated.

Another object of my invention is the provision of improved means for obtaining weight indications which are distinguishable in light or dark locations with equal facility.

Another object is the provision of a scale index which may, if desired, be invisible unless a load is being weighed.

A still further object of the invention is the combination of a cold discharge, luminous gas tube and a weighing scale.

An ancillary object is the provision of an accurate, simple coin controlled person weighing scale.

These and other objects and advantages will be apparent from the following description in which reference is had to the accompanying drawing illustrating a preferred embodiment of my invention and wherein similar reference numerals designate similar parts throughout the several views.

Referring to the drawing:

Figure I is a fragmentary, front elevational view of a scale embodying my invention, and Figure II is a fragmentary, side elevational view, sectioned substantially along the line II—II of Figure I.

Scale mechanism, per se, forms no part of my invention and therefore, I have not shown its embodiment in combination with any particular type of load counterbalancing mechanism. It will be obvious after reading the following description that it may be used in connection with a spring scale with equal facility as with a scale having an accurate pendulum counterbalancing mechanism.

Referring to the drawing in detail, the embodiment of my invention is shown housed in a substantially watch case shaped casing 1 in which the load counterbalancing mechanism (not shown) is usually located. This casing is mounted upon a column like housing 2, a fragment thereof is shown in the figures. A shaft 3 which is actuated by counterbalancing mechanism is mounted in suitable anti-friction bearings (not shown) to the end of which a disc 4 of light material is attached, so that when the shaft 3 is revolved by the scale load counterbalancing mechanism the disc 4 is similarly rotated through an angle which is proportional to the weight of the load. Immediately in front of the rotatable disc 4 is mounted an indicia bearing chart 5. This chart is made from glass or other transparent material and simultaneously serves to enclose the mechanism thus eliminating the customary housing glass. This chart is provided with a circular band 6 concentrically arranged which is preferably sand blasted or otherwise made translucent but its treatment must be such that its transparency is destroyed.

A series of weight division lines and their designating numerals extend from one of the edges of this band. These lines and numerals are printed on the back surface of the glass with a translucent pigment, while the remaining surface of the chart is covered with an opaque coat, so that under normal conditions the figures contrast from the background and may be readily distinguished from the front of the scale. The sand blasted band 6 receives no further treatment.

To indicate the weight of the load, the rotatable disc 4 referred to hereinbefore as having a rotation in proportion to the weight of the load is provided with a cut-out character 7 usually "arrow" shaped, so that light emanating from an annular shaped neon or similar gaseous luminescent tube 8 is projected through the character 7 and thus an image of this character is formed on the band 6 and the apex of the character points to the division line representing the weight. When the scale is stationed in a dark location so that the indicia are not readily distinguishable sufficent diffused light will shine through the character 7 to illuminate from the rear, the translucent figure to which the character 7 is pointing thus making the weight indication visible. The light tube 8 which in this embodiment is in the form of a ring, is secured to the casing by means of a plurality of brackets 9. It is, of course, obvious that the figures may be printed with an opaque pigment, and the surface of the chart be covered with a translucent coloring to accomplish the same result.

Since the weight graduations and the corresponding numerals are printed on the back of the glass 5 and since the band on which the image of the perforation 7 is cast by the light of the neon tube is also on the back of the glass, the operator cannot make mistakes which are due to parallax in reading the indication regardless of the position from which he is observing the scale as the indicia and index which in this embodiment is formed by the projected image of the perforation are in the same plane.

The indications of the scale being visible only when the character is projected on the translucent band 6, it will be obvious that when the electric circuit feeding the tube is controlled with a make and break switch which is controlled by the insertion of a coin or check; a scale equipped with the herein described embodiment of my invention forms a very efficient person weigher since the weighing mechanism is entirely free from such mechanism locking means which are liable to interfere with the accurate operation of the scale and the indication is not visible until a proper coin or check has been inserted into such means as provided on the scale. Coin operated switches of the type which may advantageously be employed are widely known and since "neon" or other similar discharge tubes and their operation are equally well known, I have refrained from describing them or their operations for the sake of brevity.

The embodiment of my invention herein shown and described is to be regarded as illustrative only and it is to be understood that the invention is susceptible to variation, modification and change within the spirit and scope of the sub-joined claims.

Having described my invention, I claim:

1. In a device of the class described, in combination, a chart, said chart having a translucent concentric band, translucent areas forming weight indicia and designating numerals adjacent said translucent band, an opaque surface covering the remaining area of said chart, an opaque disc, rotatably stationed back of said chart and having an area co-extensive with the areas of said chart, an index perforation within said disc, a neon tube stationed back of said disc whereby direct rays from said neon tube project an image of said perforation upon the back of said concentric band, said image being in indicating relation to at least one of said translucent areas forming weight indicia, said image viewed from the front of said chart lies in the same plane as said weight indicia upon said chart whereby errors due to parallax are obviated.

2. In a device of the class described, in combination, a chart, said chart having a translucent concentric band, translucent areas forming weight indicia and designating numerals adjacent said translucent band, an opaque surface covering the remaining area of said chart, an opaque disc rotatably stationed back of said chart and having an area co-extensive with the areas of said chart, an index perforation within said disc, a neon tube stationed back of said disc whereby direct rays from said neon tube project an image of said perforation upon the back of said concentric band, said image being in indicating relation to at least one of said translucent areas forming weight indicia, said image viewed from the front of said chart lies in the same plane as said weight indicia upon said chart whereby errors due to parallax are obviated, and diffused reflected rays from said neon tube straying through said perforation being adapted to fall upon adjacent translucent surfaces, whereby said surfaces become luminous when viewed from a position in front of said chart.

HAROLD L. van DOREN.